United States Patent
Karaoguz

(10) Patent No.: US 8,838,101 B2
(45) Date of Patent: *Sep. 16, 2014

(54) MULTI-COMMUNICATION PATHWAY ADDRESSING IN A MOBILE COMMUNICATION DEVICE

(75) Inventor: Jeyhan Karaoguz, Irvine, CA (US)

(73) Assignee: Broadcom Corporation, Irvine, CA (US)

( * ) Notice: Subject to any disclaimer, the term of this patent is extended or adjusted under 35 U.S.C. 154(b) by 93 days.

This patent is subject to a terminal disclaimer.

(21) Appl. No.: 13/041,607

(22) Filed: Mar. 7, 2011

(65) Prior Publication Data

US 2011/0159872 A1 Jun. 30, 2011

Related U.S. Application Data

(63) Continuation of application No. 11/419,153, filed on May 18, 2006, now Pat. No. 7,912,468.

(60) Provisional application No. 60/776,650, filed on Feb. 24, 2006.

(51) Int. Cl.
- *H04W 4/00* (2009.01)
- *H04W 88/06* (2009.01)
- *H04W 48/18* (2009.01)
- *H04W 76/02* (2009.01)

(52) U.S. Cl.
CPC .............. *H04W 88/06* (2013.01); *H04W 48/18* (2013.01); *H04W 76/025* (2013.01)
USPC ................... 455/435.2; 455/552.1; 455/426.1

(58) Field of Classification Search
CPC .... H04W 48/18; H04W 76/025; H04W 88/06
USPC ................ 455/434, 426.1, 435.1, 127.4, 436, 455/552.1, 432.1, 435.2, 553.1, 160.1, 457, 455/566, 145, 154.2, 158.4
See application file for complete search history.

(56) References Cited

U.S. PATENT DOCUMENTS

| | | | |
|---|---|---|---|
| 6,801,777 B2 * | 10/2004 | Rusch | ......................... 455/452.2 |
| 7,103,388 B2 | 9/2006 | Scott | |

(Continued)

FOREIGN PATENT DOCUMENTS

| | | |
|---|---|---|
| EP | 1 241 905 | 9/2002 |
| EP | 1 241 905 A1 | 9/2002 |

(Continued)

OTHER PUBLICATIONS

Non-Final Rejection mailed Jul. 21, 2009 for U.S. Appl. No. 11/419,153, filed May 18, 2006; 19 pages.

(Continued)

*Primary Examiner* — Dominic E Rego
(74) *Attorney, Agent, or Firm* — Sterne, Kessler, Goldstein & Fox P.L.L.C.

(57) ABSTRACT

A system and method for performing multi-communication pathway addressing in a mobile communication device. Various aspects of the present invention may comprise at least one communication interface module adapted to communicate with at least a first plurality of communication networks. At least one module may be adapted to utilize the at least one communication interface module to conduct a particular type of communication over any of the first plurality of communication networks. A user interface module may be adapted to receive user input indicative of a desired communication. In response to such a received user input, the at least one module may be adapted to identify, from the received user input, at least one communication network of the first plurality of communication networks and utilize the at least one communication interface module to conduct the desired communication (e.g., of the particular type of communication) over the identified at least one communication network.

21 Claims, 8 Drawing Sheets

(56) References Cited

U.S. PATENT DOCUMENTS

| | | | |
|---|---|---|---|
| 7,245,913 B1* | 7/2007 | Nguyen et al. | 455/435.2 |
| 7,363,032 B2* | 4/2008 | Phillips et al. | 455/422.1 |
| 7,444,165 B2 | 10/2008 | van Rooyen | |
| 7,562,302 B1 | 7/2009 | Barrus et al. | |
| 7,818,024 B2* | 10/2010 | Gunaratnam et al. | 455/525 |
| 7,912,468 B2* | 3/2011 | Karaoguz | 455/435.2 |
| 2003/0125043 A1 | 7/2003 | Silvester | |
| 2003/0165273 A1 | 9/2003 | Berkner et al. | |
| 2004/0018857 A1* | 1/2004 | Asokan et al. | 455/564 |
| 2004/0028009 A1 | 2/2004 | Dorenbosch et al. | |
| 2004/0077341 A1* | 4/2004 | Chandranmenon et al. | 455/418 |
| 2004/0192301 A1* | 9/2004 | Shi | 455/435.1 |
| 2004/0204133 A1* | 10/2004 | Andrew et al. | 455/566 |
| 2004/0229663 A1 | 11/2004 | Tosey et al. | |
| 2005/0099977 A1* | 5/2005 | Williams et al. | 370/338 |
| 2005/0101293 A1* | 5/2005 | Mentze et al. | 455/410 |
| 2005/0101318 A1* | 5/2005 | Williams et al. | 455/434 |
| 2005/0105497 A1* | 5/2005 | Belkin et al. | 370/338 |
| 2005/0107109 A1* | 5/2005 | Gunaratnam et al. | 455/525 |
| 2005/0124382 A1* | 6/2005 | Britt et al. | 455/556.2 |
| 2005/0212802 A1 | 9/2005 | Takeda et al. | |
| 2006/0041581 A1* | 2/2006 | Aghvami et al. | 707/102 |
| 2006/0072456 A1* | 4/2006 | Chari et al. | 370/230 |
| 2006/0084417 A1* | 4/2006 | Melpignano et al. | 455/418 |
| 2006/0084479 A1* | 4/2006 | Kim et al. | 455/566 |
| 2006/0153080 A1* | 7/2006 | Palm | 370/237 |
| 2006/0209677 A1* | 9/2006 | McGee et al. | 370/216 |
| 2006/0212332 A1* | 9/2006 | Jackson | 705/8 |
| 2006/0234735 A1 | 10/2006 | Digate et al. | |
| 2007/0021143 A1* | 1/2007 | Jain et al. | 455/552.1 |
| 2007/0026856 A1* | 2/2007 | Krantz et al. | 455/426.1 |
| 2007/0036135 A1 | 2/2007 | Patron et al. | |
| 2007/0042708 A1 | 2/2007 | Stefani | |
| 2007/0049242 A1 | 3/2007 | Fair et al. | |
| 2007/0073887 A1 | 3/2007 | Prasad et al. | |
| 2007/0091855 A1 | 4/2007 | Karaoguz et al. | |
| 2007/0097863 A1* | 5/2007 | Smith et al. | 370/230 |
| 2007/0110034 A1 | 5/2007 | Bennett | |
| 2007/0171879 A1* | 7/2007 | Bourque | 370/338 |
| 2007/0201809 A1 | 8/2007 | Karaoguz | |
| 2007/0211683 A1 | 9/2007 | Shaheen et al. | |
| 2007/0298795 A1* | 12/2007 | Zinn et al. | 455/435.1 |
| 2008/0096559 A1* | 4/2008 | Phillips et al. | 455/435.2 |
| 2009/0168701 A1 | 7/2009 | White et al. | |
| 2012/0115434 A1* | 5/2012 | Lazaridis | 455/406 |
| 2013/0104214 A1* | 4/2013 | Beck et al. | 726/7 |

FOREIGN PATENT DOCUMENTS

| | | |
|---|---|---|
| EP | 1 517 575 A2 | 3/2005 |
| EP | 1 517575 | 3/2005 |
| GB | 2 333 423 | 7/1999 |
| WO | WO 2004/003091 | 4/2004 |
| WO | WO 2004/030391 | 4/2004 |

OTHER PUBLICATIONS

Final Rejection mailed Apr. 13, 2010 for U.S. Appl. No. 11/419,153, filed May 18, 2006; 24 pages.

Notice of Allowance mailed Oct. 15, 2010 for U.S. Appl. No. 11/419,153, filed May 18, 2006; 6 pages.

European Search Report directed to related European Patent Application No. 06024205.4-2414, mailed Jul. 29, 2009; 7 pages.

\* cited by examiner

MULTI-COMMUNICATION PATHWAY ADDRESSING IN A MOBILE COMMUNICATION DEVICE

CROSS-REFERENCE TO RELATED APPLICATIONS

Incorporation by Reference

The present application is a continuation of U.S. patent application Ser. No. 11/419,153, filed May 18, 2006, currently pending; which makes reference to, claims priority to and claims benefit from U.S. Provisional Patent Application Ser. No. 60/776,650, filed Feb. 24, 2006, and titled "MULTI-COMMUNICATION PATHWAY ADDRESSING IN A MOBILE COMMUNICATION DEVICE". The contents of each of the above-mentioned applications are hereby incorporated herein by reference in their entirety.

FEDERALLY SPONSORED RESEARCH OR DEVELOPMENT

[Not Applicable]

SEQUENCE LISTING

[Not Applicable]

MICROFICHE/COPYRIGHT REFERENCE

[Not Applicable]

BACKGROUND OF THE INVENTION

A mobile communication device may be adapted to communicate over a plurality of communication networks. A user of a mobile communication device may, for example, communicate with a first party that is capable of communicating over a first communication network. The user may also, for example, communicate with a second party that is capable of communicating over a second communication network. In an exemplary scenario, the user may further, for example, communicate with the first party over the second communication network (e.g., if the first party is also capable of communicating over the second communication network). Such communication over the plurality of communication networks is generally handled independently.

Further limitations and disadvantages of conventional and traditional approaches will become apparent to one of skill in the art, through comparison of such systems with the present invention as set forth in the remainder of the present application with reference to the drawings.

BRIEF SUMMARY OF THE INVENTION

Various aspects of the present invention provide a system and method for performing multi-communication pathway addressing in a mobile communication device, substantially as shown in and/or described in connection with at least one of the figures, as set forth more completely in the claims. These and other advantages, aspects and novel features of the present invention, as well as details of illustrative aspects thereof, will be more fully understood from the following description and drawings.

DETAILED DESCRIPTION

Figure 1:
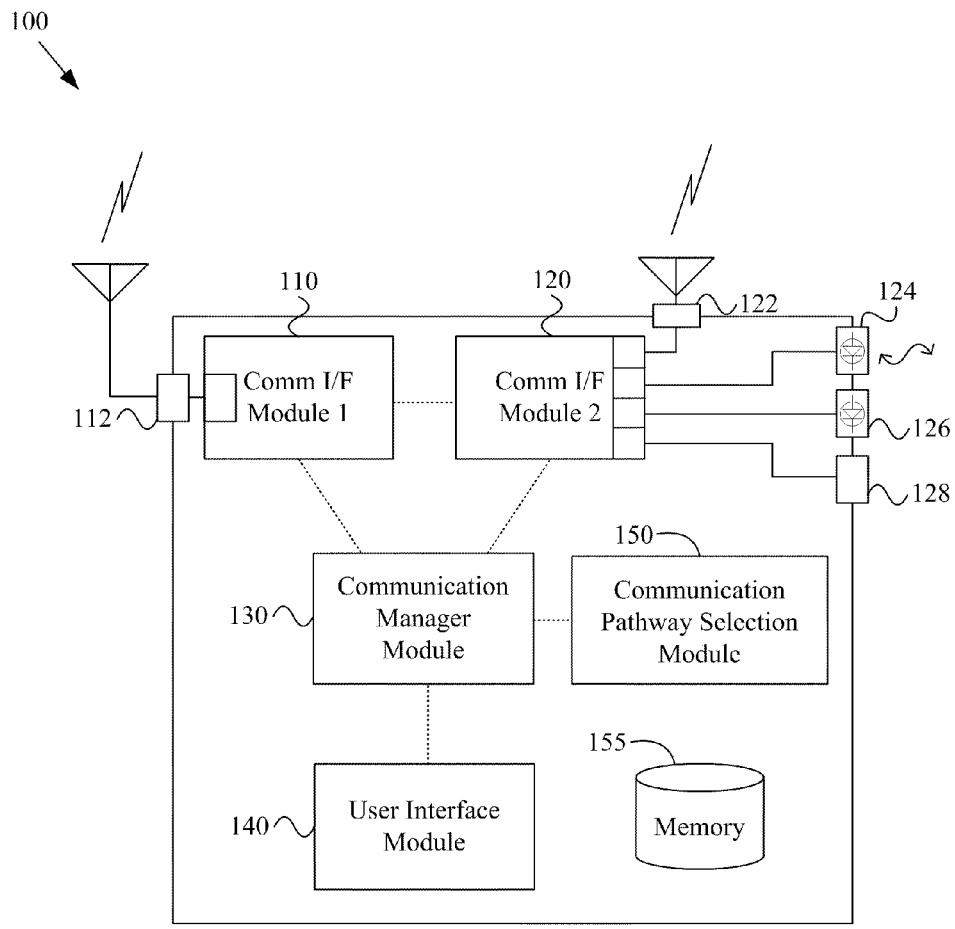
FIG. 1 is a block diagram illustrating an exemplary mobile communication device adapted to provide multi-communication pathway addressing, in accordance with various aspects of the present invention.

FIG. 1 is a block diagram illustrating an exemplary mobile communication device adapted to provide multi-communication pathway addressing, in accordance with various aspects of the present invention. The mobile communication device 100 may comprise characteristics of any of a variety of types of mobile communication devices. For example and without limitation, the mobile communication device may comprise characteristics of a cellular telephone, personal digital assistant, handheld computer, personal email device, portable music player with communication capability, portable navigation system, etc. Accordingly, the scope of various aspects of the present invention should not be limited by characteristics of any particular type of mobile communication device.

The exemplary mobile communication device 100 may comprise at least one communication interface module adapted to communicate with (i.e., directly with) a plurality of communication networks. Such flexibility, among other things, provides the mobile communication device 100 the capability to communicate over a plurality of alternative communication pathways (e.g., with a single other communication device or a plurality of other communication devices).

The mobile communication device 100 may comprise a first communication interface module 110 and a second communication interface module 120. The illustration of two distinct communication interface modules is for illustrative clarity and should not be limiting. For example, the mobile communication device 100 may comprise more than two communication interface modules. Also for example, communication interface modules may share various hardware and/or software components rather than having distinct boundaries.

The first communication interface module 110 may, for example, be adapted to communicate with (or over) a first communication network (and, e.g., one or more associated communication pathways). Such a first communication network may, for example, be or comprise various characteristics of a telephony communication network. Such a telephony communication network may, for example, be or comprise various characteristics of a cellular telephone network or the Public Switched Telephone Network ("PSTN"). In an exemplary configuration where the first communication interface module 110 is adapted to communicate over a cellular telephone network, the first communication interface module 110 may, for example, be adapted to communicate in accordance with any of a large variety of cellular communication standard and/or propriety communication protocols (e.g., 1G, 2G, 3G, 4G, CDMA, WCDMA, PDC, TDMA, GSM/GPRS/EDGE, CDMA2000, etc.).

The first communication interface module 110 may be adapted to communicate over any of a variety of communication media. For example, the first communication module 110 may be adapted to communicate wirelessly utilizing the wireless port 112. Alternatively, for example, though not illustrated in FIG. 1, the first communication interface module 110 may be adapted to communicate via wired interface, non-tethered optical interface or tethered optical interface.

The second communication interface module 120 may, for example, be adapted to communicate with (or over) a second communication network (and, e.g., one or more associated communication pathways). Such a second communication network may, for example, be or comprise various characteristics of a computer communication network. In such an exemplary configuration, a computer communication network may, for example, be or comprise various characteristics of any of a variety of computer communication networks (e.g., the Internet, a Wide Area Network ("WAN"), a Local Area Network ("LAN"), a Personal Area Network ("PAN"), a Metropolitan Area Network ("MAN"), a terrestrial computer communication network, a satellite computer communication network, etc.). Also, in such an exemplary configuration, the second communication interface module 120 may, for example, be adapted to communicate with the computer communication network utilizing any of a large variety of lower level standard and/or proprietary protocols (e.g., IEEE 802.3, IEEE 802.11, IEEE 802.15, IEEE 802.16, IEEE 802.20, etc.) or higher-level standard and/or proprietary protocols (e.g., TCP/IP).

As with the first communication interface module 110, the second communication interface module 120 may be adapted to communicate over any of a variety of communication media. For example and without limitation, the second communication interface module 120 may be adapted to communicate via a wireless communication link (e.g. utilizing the wireless port 122), via a wired communication link (e.g., utilizing the wired communication port 128), via a non-tethered optical link (e.g., utilizing the non-tethered optical port 124) or via tethered optical link (e.g., utilizing the tethered optical port 126).

The exemplary mobile communication device 100 may also comprise a communication manager module 130 generally adapted to manage communications occurring with the mobile communication device 100. The communication manager module 130 may be or comprise characteristics of any of a large variety of modules or devices associated with performing general communication tasks in a mobile communication device. For example and without limitation, the communication manager module 130 may comprise or oversee operation of various signal processors, codecs, user interfaces, applications, etc., which may be associated with any of the plurality of communication networks and/or types of communication with which the mobile communication device 100 may be capable of communicating.

For example, the communication manager module 130 may be adapted to utilize at least one communication interface module (e.g., the first communication interface module 110 and/or second communication interface module 120) to conduct a particular type of communication with (or over) any of a plurality of communication networks (and associated communication pathways) with which the at least one communication interface module is adapted to communicate.

The following discussion will, at times, refer to various types of communication that may be performed over a communication network or pathway (e.g., over a computer communication network). Examples of such various types of communication may, for example, comprise data file communication (e.g., communicating various types of computer data files like MP3 files, WAV files, MPEG files, word processor files, JPEG files, drawing files, software files, etc.), voice conversation communication (e.g., substantially real-time voice communication between two or more parties), multimedia conversation communication (e.g., substantially real-time multimedia communication between two or more parties), email communication, instant text message communication, web browsing communication, music streaming, video streaming, radio broadcasting, television broadcasting, etc.

The communication manager module 130 may, for example, utilize at least one communication interface module (e.g., the first communication interface module 110 and/or the second communication interface module 120) to conduct a desired communication over an identified communication network (or associated communication pathway). Identification of a communication network and/or associated communication pathway will be discussed in more detail below.

The communication manager module 130 may also, for example, be adapted to perform or manage various secure access and/or secure communication functionalities. Also for example, the communication manager module 130 may be adapted to perform or manage various power management functionalities. Additionally for example, the communication manager module 130 may be adapted to control user access to particular functions that the mobile communication device 100 is capable of performing.

Also for example, the communication manager module 130 may be adapted to perform or manage various flows of information within the mobile communication device 130. For example, the communication manager module 130 may be adapted to control the flow of information between various protocol stack layers (e.g., between an application layer, transport layer, network layer, etc.). Also for example, the communication manager module 130 may be adapted to perform or manage the functionality of various protocol stack layers. The communication manager module 130 may thus be adapted to manage the flow of various types of information between various devices, modules or sub-modules. Such types of information may, for example, include control information, numerical information, textual information, audio information, video information, graphical information, pictorial information, etc.

The exemplary mobile communication device 100 may also comprise a user interface module 140. The user interface module 140 may generally provide an interface between the mobile communication device 100 and a user of the mobile communication device 100. The user interface module 140 may comprise characteristics of any of a variety of user interfaces. The user interface module 140 may, for example and without limitation, be adapted to provide any of a variety of audio, video and/or tactile user interfaces. For example, the user interface module 140 may be adapted to provide video display, audio speaker, video camera, microphone, touch screen, touchpad, keypad and vibration U/I functionality.

The mobile communication device 100 (e.g., the communication manager module 130) may, for example, utilize the user interface module 140 to provide a communication interface (e.g., video, audio and/or textual) between a user of the mobile communication device 100 and other devices communicatively coupled to the mobile communication device 100. For example, the mobile communication device 100 may utilize the user interface module 140 to notify a user of an incoming message to the mobile communication device 100 from another communication device (e.g., another mobile communication device).

As a non-limiting example, the mobile communication device 100 may utilize the user interface module 140 to provide a user interface for information communicated over various communication networks, where the user interface shares various characteristics with a typical mobile telephone user interface. For example, for communications between the mobile communication device 100 and another mobile communication device over a computer communication network, the mobile communication device 100 may utilize the user interface module 140 to provide a user interface that is generally the same as the user interface for a mobile telephone communication over a mobile telephone communication network.

As will be discussed below, the user interface module 140 may be utilized by various other modules of the mobile communication device 100. For example, various other modules of the mobile communication device 100 (e.g., the communication pathway selection module 150) may utilize the user interface module 140 to communicate information to a user regarding communication networks (or pathways) that are presently available for communication and/or various types of communication that may presently be performed over available communication networks. Additionally, various other modules of the mobile communication device 100 may utilize the user interface module 140 to communicate information to a user of the mobile communication device 100 indicating a manner in which the user may act to enable communication over a particular communication network and/or enable a particular type of communication. Such information may, for example, comprise contact information, payment information, information regarding user authentication, exigency information, etc.

In a non-limiting exemplary scenario, the user interface module 140 may be adapted to (e.g., under the direction of the communication manager module 130 and/or the communication pathway selection module 150) receive user input indicative of a desired communication. Such input may be solicited by the user interface module 140 or may be unsolicited.

In a non-limiting exemplary scenario comprising the user interface module 140 soliciting such user input, the user interface module 140 may be adapted to present a first plurality of visual indicia (or other indicia) to the user (e.g., only the first plurality or in addition to one or more other indicia). The user may then, for example, select presented indicia (e.g., by touch screen, scrolling, voice, key press, touchpad, etc.).

Each indicium of the first plurality of indicia may, for example, be associated with performing a particular type of communication over a particular communication network or pathway (e.g., over which the communication interface modules 110 and 120 are capable of communicating). The user interface module 140 may then, for example, be adapted to receive a user selection of a presented visual indicium. Information of a selected indicium may be processed by the user interface module 140 and/or may be forwarded to other modules of the mobile communication device 100 (e.g., the communication manager module 130 or the communication pathway selection module 150).

Visual indicia may comprise any of a variety of characteristics. For example, visual indicia may comprise characteristics of graphical images (e.g., icons), pictorial images, textual images, etc. Such visual indicia may, in turn, be characterized by various visual characteristics (e.g., color, brightness, sharpness, size, animation, menu position, etc.). Such visual characteristics may, for example, be indicative of various communication-related characteristics (e.g., the availability of particular communication networks or pathways, particular types of communication, particular third parties, particular other communication nodes or devices, etc.).

In one example, the user interface module 140 may be adapted to present a first visual indicium associated with establishing voice conversation communication with a first communication device over a first communication network (e.g., a cellular telephone network). Continuing the example, the user interface module 140 may also be adapted to present a second visual indicium associated with establishing voice conversation communication with the first communication device over a computer network (e.g., a LAN or the Internet). Continuing the example, the user interface module 140 may additionally be adapted to present a third visual indicium associated with establishing a web browsing session with a web browser over the first communication network (e.g., over a cellular telephone network using GPRS/EDGE). Continuing the example, the user interface module 140 may further be adapted to present a fourth visual indicium associated with establishing a web browsing session with the web browser over the second communication network (e.g., a LAN or the Internet).

In a scenario where the user interface module 140 is adapted to present visual indicia indicative of particular communications, the visual indicia may, for example, comprise characteristics indicating the availability of particular communication networks (or pathways) or particular types of communication (e.g., in general or with regard to particular third parties). In a non-limiting exemplary scenario, the user interface module 140 might only present indicia representative of a communication that may presently be established, while not presenting indicia associated with presently unavailable communications. In another non-limiting exemplary scenario, the user interface module 140 might present indicia associated with potential communications, but utilize particular visible characteristics of the indicia to indicate communications that are presently available.

For example, in a first non-limiting exemplary scenario, the user interface module 140 might present a first indicium associated with establishing a first voice conversation communication with a third party over a first communication network or pathway (e.g., a cellular telephone network) and a second indicium associated with establishing a second voice conversation communication with the third party over a second communication network or pathway (e.g., a particular computer network). The first indicium may, for example, be colored, sized, sharpened, highlighted, etc., to indicate that a voice conversation communication link over the first communication network or pathway may be presently established (or even that the third party is presently available over such network). The second indicium may, for example, be colored, sized, blurred, dimmed, etc., to indicate that a voice conversation communication link over the second communication network or pathway may not be presently established (or even that the third party is not presently available over such network).

Continuing the first non-limiting exemplary scenario, the user interface module 140 may also present one or more indicia and make such indicia selectable or non-selectable by the user according to whether or not the particular communication is available. For example, if a computer network (or pathway) for communicating voice conversation information (e.g., utilizing VoIP) is not presently available, the user interface module 140 may, alternatively or in addition to characterizing an indicium associated with the unavailable computer network (or pathway) with visual characteristics, make the visual indicium non-selectable by the user.

In a non-limiting exemplary scenario comprising the user interface module 140 receiving unsolicited user input, the user interface module 140 may be adapted to monitor (e.g., continually, periodically or by interrupt) various user input features of the mobile communication device 100. Such user input features may, for example, include keypads, touch pads, voice input, touch screen input, etc.

The user interface module 140 (e.g., independently or under the control of other modules of the mobile communication device 100) may present visual indicia associated with particular communications in response to any of a variety of causes or conditions. For example, a user may indicate a general desire to establish a communication, and in response to such indication, the user interface module 140 may present the visual indicia to the user. Also for example, a user may indicate a specific desire to establish a communication with a particular third party or group, and in response to such indication, the user interface module 140 may present the visual indicia to the user (e.g., as a list of communication options or alternatives). Further for example, a user may indicate a specific desire to establish a particular type of communication with a particular third party or group, and in response to such indication, the user interface module 140 may present the visual indicia to the user (e.g., as a list of communication network or pathway alternatives).

In general, the user interface module 140 may be adapted to provide an interface between the mobile communication device 100 and a user thereof. Accordingly, the scope of various aspects of the present invention should not be limited by particular user interface characteristics unless explicitly claimed. Additionally, the scope of various aspects of the present invention should not be limited by characteristics of a particular type of user interface or hardware and/or software that provide a particular type of user interface.

As mentioned previously, the mobile communication device 100 may comprise a communication pathway selection module 150 ("CPSM"). The CPSM 150 may, for example, be adapted to identify (e.g., from received user input indicative of a desired communication) at least one communication network (or pathway). The identified communication network may, for example, be associated with one or more particular communication pathways between the mobile communication device 100 and a third party communication node or device.

In an exemplary scenario, the CPSM 150 may receive information regarding user selection of an indicium (e.g., a visual indicium) from the user interface module 140 (e.g., directly or through one or more intervening modules). The CPSM 150 may then identify a communication network (or pathway) associated with the selected indicium.

For example, in a non-limiting exemplary voice conversation communication scenario, the user interface module 140 (e.g., under the direction of the CPSM 150 or another module) may present a plurality of visual indicia to a user, where such visual indicia correspond to conducting voice conversation communication over respective communication networks (or pathways) with a particular third party (or associated communication node). For example, the mobile communication device 100 and third party may be able to conduct voice conversation communication over a cellular telephone network, over a Metropolitan Area Network ("MAN"), over a Local Area Network ("LAN") and over a Personal Area Network ("PAN") communicatively coupled to the Internet. The user interface module 140 may present visual indicia associated with each of such communication networks (or pathways). A user may then select one of such presented visual indicia. Information of such selected indicium may then be forwarded to the CPSM 150, which may determine the corresponding communication network (or pathway).

As mentioned previously, the CPSM 150 may direct the user interface module 140 as to the presentation of various indicia to a user. The CPSM 150 may, for example, determine which of a plurality of communication networks is available and/or available for performing a particular type of communication. The CPSM 150 may then, for example, direct the user interface module 140 to present visual indicia to a user in accordance with the determined availability. For example, as discussed previously, indicia may be presented comprising various characteristics associated with communication network (or path) availability or with the availability of a particular type of communication over a communication network.

In a non-limiting exemplary scenario, the CPSM 150 may determine that voice conversation communication with a particular third party may be performed over a first communication network (e.g., a cellular telephone network) and a second communication network (e.g., a computer network, such as a LAN and/or the Internet). The CPSM 150 may then direct the user interface module 140 to present user-selectable indicia indicating the availability of either of the communication networks (or pathways) for voice conversation communication with the third party. Such availability may be indicated by any of a variety of visual characteristics, some of which were discussed above (e.g., indicium presence/absence, highlighting, color, etc.). A user may then, for example, select an indicium associated with the desired type of communication and/or desired communication network (or pathway).

The CPSM 150 may be adapted to determine availability of various communication networks and/or types of communication in any of a variety of manners. For example and without limitation, the CPSM 150 may be adapted to determine which of a plurality of communication networks is available for performing a particular type of communication by, at least in part, accessing stored information (e.g., in a database remote from the mobile communication device or a memory 155 of the mobile communication device 100). Such stored information may, for example, comprise device addressing information (e.g., IP address, telephone number, serial number, web address, etc.), device network registration information, device capability information, device or user access privilege information, etc.).

For example, the CPSM 150 may be adapted to determine which of a plurality of communication networks is available for performing a particular type (or any type) of communication by, at least in part, determining over which of the first plurality of communication networks another communication device (e.g., the communication device of a particular third party) is capable of communicating. The CPSM 150 may make such determination by accessing stored information (remote or local), communicating test messages, interacting with a user, etc. The CPSM 150 may, for example, be adapted to make such a determination unbeknownst to a user of the CPSM 150 or under the direction of the user.

The CPSM 150 may be implemented in any of a variety of manners, some of which will be exemplified in FIGS. 2-5. For example, the CPSM 150 may be implemented in hardware, software or a combination thereof. The CPSM 150 may be implemented in any of a variety of degrees of integration (e.g., integrated in a single integrated circuit with other modules, as a stand-alone integrated circuit, etc.). Accordingly, the scope of various aspects of the present invention should not be limited by characteristics of any particular implementation or any particular degree of integration.

As mentioned previously, the mobile communication device 100 may comprise a memory 155 that may be utilized for any of a variety of purposes. Such purposes may, for example, include the storage of device contact and/or capability information. Such memory 155 may also, for example, store executable instructions for the mobile communication device 100 or various modules thereof. The memory 155 may, for example comprise characteristics of volatile and/or non-volatile memory. The memory 155 may also, for example, comprise characteristics of removable or non-removable memory.

After identification of a particular communication network (or communication pathway), the CPSM 150 may provide such identification information to the communication manager module 130 or other module (e.g., a communication software application or portion thereof). The communication manager module 130 may then, for example, perform the general communication functionality associated with performing the desired type of communication with the desired third party over the desired communication network (or communication pathway). For example, as explained above, the communication manager 130 may manage the flow of information between a user of the mobile communication device 100 and one or more communication interface modules of the mobile communication device 100. The communication manager module 130 may, for example, work in conjunction with various communication applications executing on the mobile communication device 100 (e.g., voice conversation and/or multimedia conversation applications, web browser applications, instant messaging applications, etc.).

In a non-limiting exemplary scenario, the communication manager module 130 (or other module or communication application) may utilize one or more communication interface modules to establish a communication link between the mobile communication device 100 and an identified communication network (or pathway) (e.g., as identified by the CPSM 150). The communication manager module 130 and communication module(s) may, for example, establish such a communication link utilizing communication protocols associated with the identified communication network and/or the particular type of communication.

Various aspects of the exemplary mobile communication device 100 will now be presented by way of non-limiting exemplary scenarios. The scope of various aspects of the present invention should not be limited by characteristics of such exemplary scenarios.

In a non-limiting exemplary scenario, at least one communication interface module of the mobile communication device 100 may be adapted to communicate voice conversation information with a plurality of communication networks (e.g., through a plurality of communication pathways). Such communication networks may, for example, comprise a cellular telephone network and a computer network. Such communication may, for example, be performed utilizing any of a variety of cellular telephone or computer network protocols, various examples of which were provided previously and will be provided later.

Continuing the exemplary scenario, the communication manager module 150 may be adapted to utilize the at least one communication interface module for performing such voice conversation communication over the plurality of communication networks. The user interface module 140 may be adapted to receive user input indicative of a desired voice conversation communication. In response to such a received user input, the CPSM 150 may be adapted to identify, from at least the received user input, at least one communication network (or pathway) over which to conduct such communication. The CPSM 150 may then provide such communication network (or pathway) identification to the communication manager module 130 (or other module or application managing the communication), which may then manage the desired voice conversation communication over the identified communication network (or pathway).

In another non-limiting exemplary scenario, at least one communication interface module of the mobile communication device 100 may be adapted to communicate multimedia conversation information with a plurality of communication networks (e.g., through a plurality of communication pathways). Such communication networks may, for example, comprise a cellular telephone or data network and one or more computer networks. Such communication may, for example, be performed utilizing any of a variety of cellular telephone or computer network protocols, various examples of which were provided previously and will be provided later.

Continuing the exemplary scenario, the communication manager module 150 may be adapted to utilize the at least one communication interface module for performing such multimedia conversation communication over the plurality of communication networks. The user interface module 140 may be adapted to receive user input indicative of a desired multimedia conversation communication. In response to such a received user input, the CPSM 150 may be adapted to identify, from at least the received user input, at least one communication network (or pathway) over which to conduct such communication. The CPSM 150 may then provide such communication network (or pathway) identification to the communication manager module 130 (or other module or application managing the communication), which may then manage the desired multimedia conversation communication over the identified communication network (or pathway). For example, the communication manager module 130 (or other module or application managing the multimedia conversation communication) may receive outgoing audio/visual information from the user interface module (e.g., through a microphone and camera) and communicate such information through an appropriate communication interface module, and may receive incoming audio/visual information from one or more communication interface modules and communicate such information to the user interface module for presentation to the user (e.g., on a video display and speaker).

In an additional exemplary scenario, at least one communication interface module of the mobile communication device 100 may be adapted to communicate instant text message information with a plurality of communication networks (e.g., through a plurality of communication pathways). Such communication networks may, for example, comprise a first computer network, a telephone network, a cable television network and a second computer network. Such communication may, for example, be performed utilizing any of a variety of telephone, television or computer network protocols, various examples of which were provided previously and/or will be provided later.

Continuing the exemplary scenario, the communication manager module 150 may be adapted to utilize the at least one communication interface module for performing such instant text message communication over the plurality of communication networks. The user interface module 140 may be adapted to receive user input indicative of a desired instant text message communication. In response to such a received user input, the CPSM 150 may be adapted to identify, from at least the received user input, at least one communication network (or pathway) over which to conduct such communication. The CPSM 150 may then provide such communication network (or pathway) identification to the communication manager module 130 (or other module or application managing the communication), which may then manage the desired instant text message communication over the identified communication network (or pathway).

In yet another non-limiting exemplary scenario, a single user command (e.g., a single key press, single touch or single voice command) may be associated with a particular other communication node (or device), particular type of communication and particular communication network (or communication pathway). In such an exemplary scenario, the CPSM 150 may be adapted to identify, from a single received command, another communication device (or devices) with which to communicate, a particular type of communication and at least one communication network (or pathway) of a plurality of communication networks (or pathways) over which to communicate with the identified communication node (or device) using the identified type of communication. The CPSM 150 may then provide such identification information to the communication manager module 130 (or other module or communication application), which may then utilize a particular communication interface module to conduct the identified type of communication with the identified communication node over the identified communication network(s) or pathway(s).

In still another non-limiting exemplary scenario, at least one communication interface module of the mobile communication device 100 may be adapted to communicate web-browsing information with a plurality of communication networks (e.g., through a plurality of communication pathways). Such communication networks may, for example, comprise a first computer network, a telephone network, a cable television network and a second computer network. Such communication may, for example, be performed utilizing any of a variety of telephone, television or computer network protocols, various examples of which were provided previously and/or will be provided later.

Continuing the exemplary scenario, the communication manager module 150 may be adapted to utilize the at least one communication interface module for performing such web browsing communication over the plurality of communication networks. The user interface module 140 may be adapted to receive user input indicative of a desired web browsing communication. In response to such a received user input, the CPSM 150 may be adapted to identify, from at least the received user input, at least one communication network (or pathway) over to conduct such communication. The CPSM 150 may then provide such communication network (or pathway) identification to the communication manager module 130 (or other module or application managing the communication, for example, a web browser application), which may then manage the desired web browsing communication over the identified communication network (or pathway).

Figure 2:
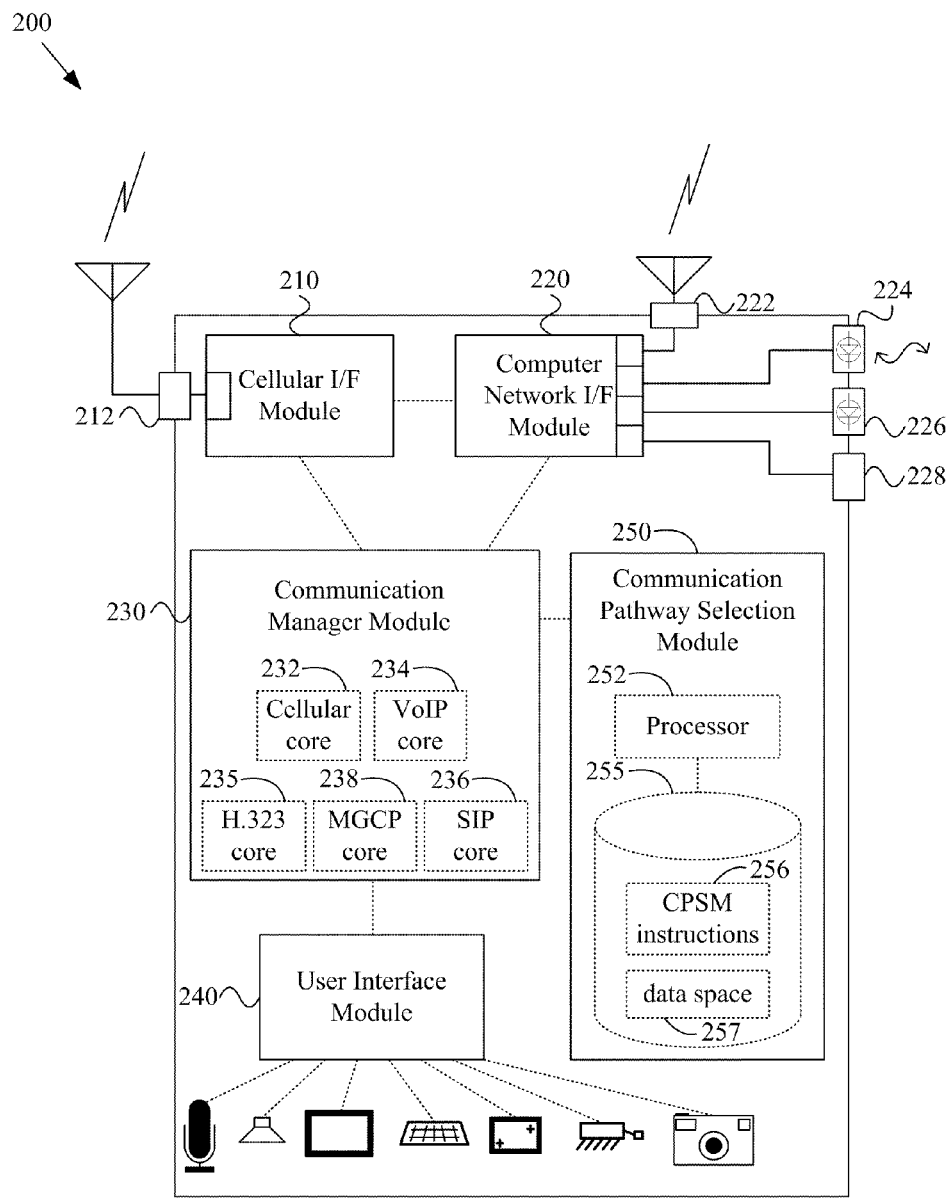
FIG. 2 is a block diagram illustrating another exemplary mobile communication device adapted to provide multi-communication pathway addressing, in accordance with various aspects of the present invention.

FIG. 2 is a block diagram illustrating another exemplary mobile communication device 200 adapted to provide multi-communication pathway addressing, in accordance with various aspects of the present invention. The exemplary mobile communication device 200 may, for example, share any or all characteristics with the exemplary mobile communication device 100 illustrated in FIG. 1 and discussed previously.

As mentioned previously, the communication manager module 230 may be adapted to generally manage communication functionality of the mobile communication device 200. In FIG. 2, the exemplary communication manager module 230 comprises (or interfaces with) various core modules related to voice conversation communication. For example, the communication manager module 230 may comprise a cellular core 232, a VoIP core 234, a H.323 core 235, a MGCP/MEGACO core 238 and a SIP core 236. The communication manager module 230 may utilize any of the voice conversation communication cores as needed.

Also, as mentioned previously, the user interface module 240 may comprise any of a variety of communication devices and/or interfaces therefor. For example, the user interface module 240 may comprise a microphone, speaker, display, keypad, touch screen, tactile output, camera and associated interfaces.

Additionally, as mentioned previously, the communication pathway selection module 250 ("CPSM") may be implemented in hardware, software or a combination thereof. The exemplary CPSM 250 illustrated in FIG. 2 is implemented by a processor 252 executing CPSM instructions 256 stored in a memory 255. The memory 255 is also illustrated with data space 257 that may be utilized for the storage of communication device information (e.g., for the mobile communication device 200 and/or other communication devices), communication network or pathway information, user information, general processing information, etc. Note that in executing the CPSM instructions 256, the processor 252 may also interface with any of a variety of CPSM support hardware and/or software.

Figure 3:
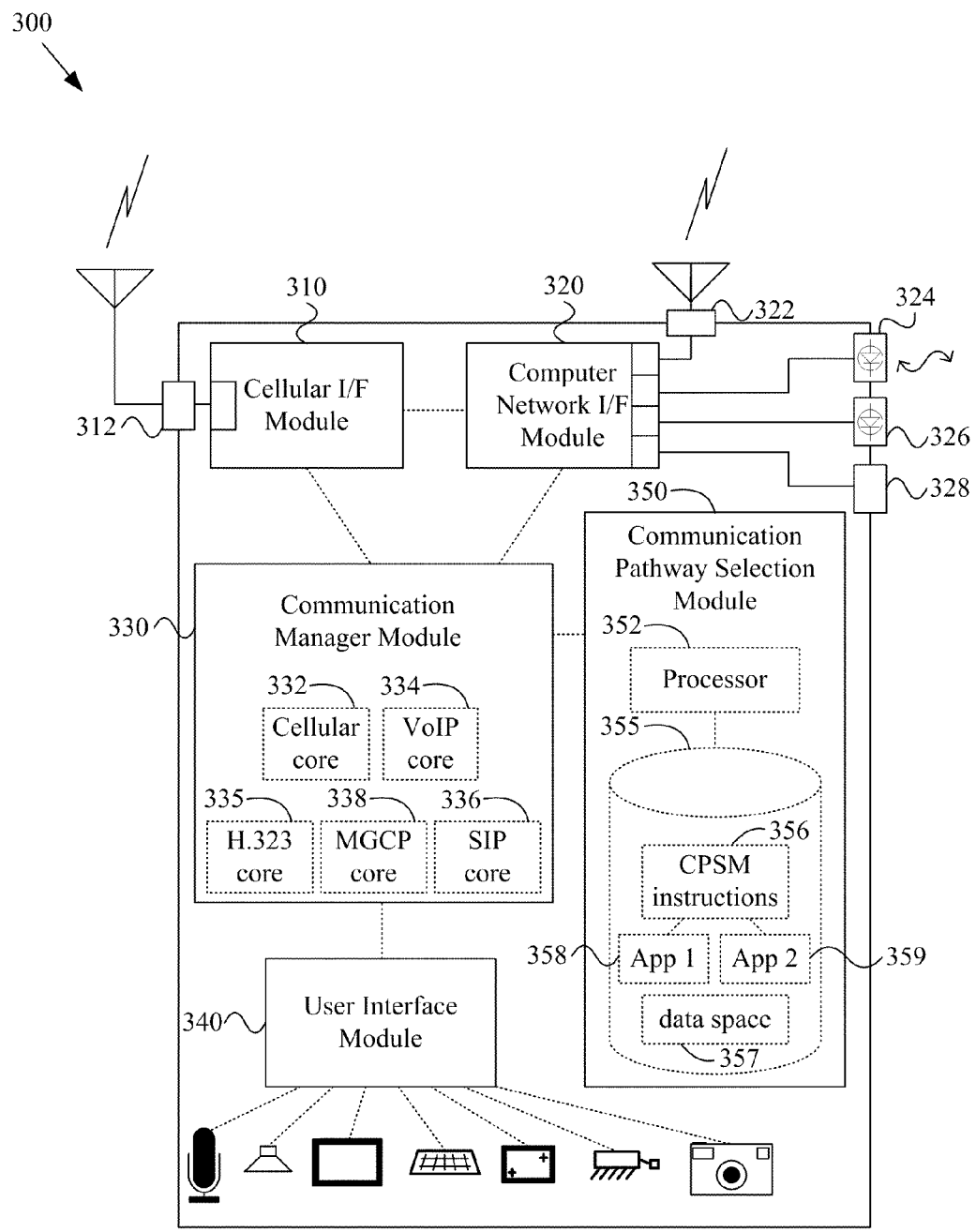
FIG. 3 is a block diagram illustrating an additional exemplary mobile communication device adapted to provide multi-communication pathway addressing, in accordance with various aspects of the present invention.

FIG. 3 is a block diagram illustrating an additional exemplary mobile communication device 300 adapted to provide multi-communication pathway addressing, in accordance with various aspects of the present invention. The exemplary mobile communication device 300 may, for example, share any or all characteristics with the exemplary mobile communication devices 100 and 200 illustrated in FIGS. 1-2 and discussed previously.

As mentioned previously, the CPSM 350 may be implemented in hardware, software or a combination thereof. Also as discussed previously, the CPSM 350 may be adapted to interface with any of a variety of other modules (e.g., hardware and/or software modules, the communication manager module 330, communication applications, etc.). In FIG. 3, the CPSM 350 is implemented by a processor 352 executing CPSM instructions 356 stored in a memory 355. The memory 355 is also illustrated with a first communication application 358 and a second communication application 359, which when executed by the processor 352, result in the processor 352 performing or managing respective communications associated with the executing applications. The first and second communication applications 358 and 359 may, for example, utilize communication pathway selection services provided by the processor 352 executing the CPSM instructions 356. For example, the processor 352 may execute the CPSM instructions 356 as an autonomous process or may execute particular CPSM instructions 356 upon request (or invocation) by instructions of the first or second communication applications 358 and 359 also executing on the processor 352. In a non-limiting exemplary scenario, CPSM instructions 356 may be mapped to locations to which the first and second communication applications 358 and 359 may link.

Figure 4:
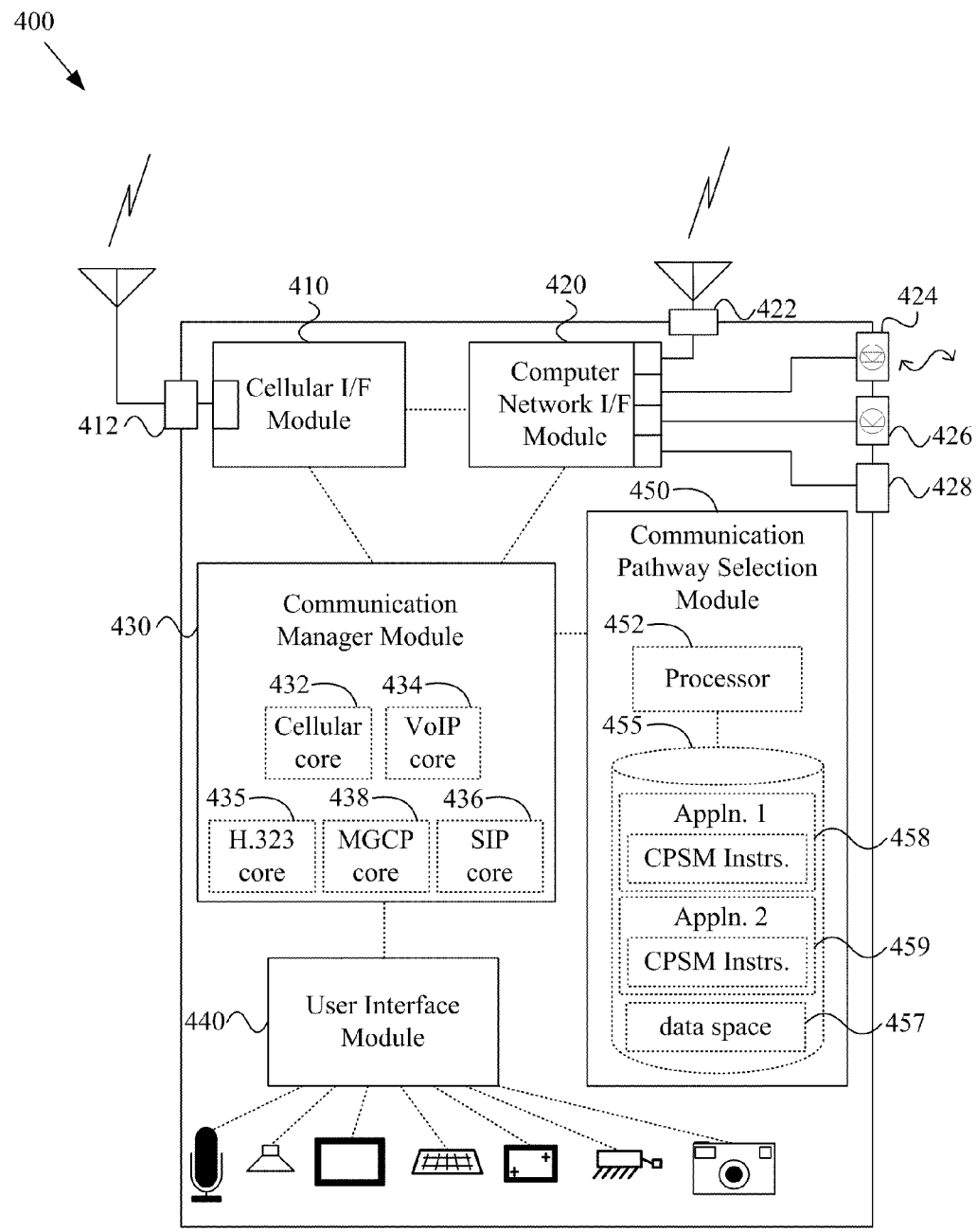
FIG. 4 is a block diagram illustrating still another exemplary mobile communication device adapted to provide multi-communication pathway addressing, in accordance with various aspects of the present invention.

FIG. 4 is a block diagram illustrating still another exemplary mobile communication device 400 adapted to provide multi-communication pathway addressing, in accordance with various aspects of the present invention. The exemplary mobile communication device 400 may, for example, share any or all characteristics with the exemplary mobile communication devices 100, 200 and 300 illustrated in FIGS. 1-3 and discussed previously.

As mentioned previously, the CPSM 450 may be implemented in hardware, software or a combination thereof. Also as discussed previously, the CPSM 450 may be adapted to interface with any of a variety of other modules (e.g., hardware and/or software modules, the communication manager module 430, communication applications, etc.). In FIG. 4, the CPSM 450 is implemented by a processor 452 executing CPSM instructions 456 stored in a memory 455 as subroutines of a first communication application 458 and a second communication application 459. Execution of the first and second communication applications 459 and 459 by the processor 452, results in the processor 452 performing respective communications associated with the executing applications, which includes implementation of various CPSM instructions embedded in the applications. The first and second communication applications 458 and 459 may, for example, utilize communication pathway selection services provided by the processor 452 executing the CPSM instructions embedded within the applications. Software instructions corresponding to various CPSM functions may, for example, be published as library routines for incorporation into applications developed to execute on the mobile communication device 400.

Figure 5:
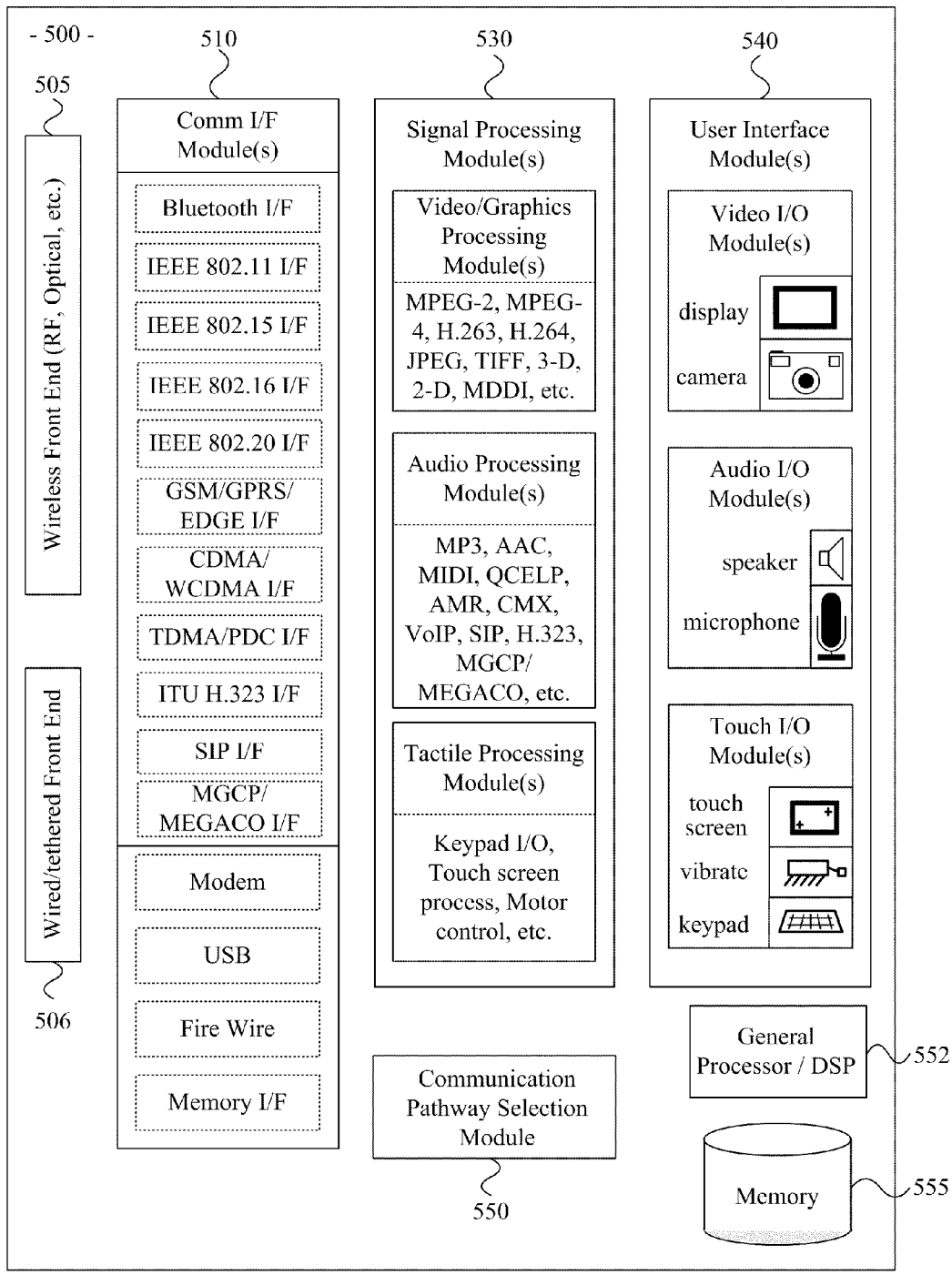
FIG. 5 is a block diagram illustrating yet another exemplary mobile communication device adapted to provide multi-communication pathway addressing, in accordance with various aspects of the present invention.

FIG. 5 is a block diagram illustrating yet another exemplary mobile communication device 500 adapted to provide multi-communication pathway addressing, in accordance with various aspects of the present invention. The exemplary mobile communication device 500 may, for example, share any or all characteristics with the exemplary mobile communication devices 100-400 illustrated in FIGS. 1-4 and discussed previously.

The exemplary mobile communication device 500 may comprise a wireless front end 505 and/or a wired/tethered front end 506. The wireless front end 505 and the wired/tethered front end 506 may be communicatively coupled to any of a variety of communication interface modules 510. The exemplary mobile communication device 500 is illustrated with a non-limiting exemplary set of communication interface modules 510, including: a Bluetooth interface module, IEEE 802.11 interface module, IEEE 802.15 interface module, IEEE 802.16 interface module, IEEE 802.20 interface module, GSM/GPRS/EDGE interface module, CDMA/WCDMA interface module, TDMA/PDC interface module, H.323 interface module, SIP interface module, MGCP/MEGACO interface module, modem module, USB module, fire wire module and memory interface module (e.g., for interfacing with off-board or removable memory). The wireless front end 505, wired/tethered front end 506 and communication interface modules 510 may, for example and without limitation, share any or all characteristics with the communication interface module(s) 110, 120, 210, 220, 310, 320, 410 and 420 of the exemplary mobile communication devices 100-400 illustrated in FIGS. 1-4 and discussed previously.

The exemplary mobile communication device 500 may also comprise any of a variety of user interface module(s) 540. The user interface module(s) 540 may, for example and without limitation, share any or all characteristics with the user interface module(s) 140, 240, 340 and 440 of the exemplary mobile communication devices 100-400 illustrated in FIGS. 1-4 and discussed previously. The exemplary mobile communication device 500 is illustrated with a non-limiting exemplary set of user interface module(s) 540 (or sub-modules). The user interface module(s) 540 may, for example, comprise any of a variety of video/graphics processing modules, audio processing modules, and tactile signal processing modules. The mobile communication device 500 may also comprise compatible user interface devices corresponding to the various user interface module(s) 540 (e.g., a video display, camera, speaker, microphone, touch screen, keypad, vibrator, etc.).

The exemplary mobile communication device 500 is illustrated with a non-limiting exemplary set of signal processing modules 530, which may be selectively utilized in accordance with current signal processing needs. The signal processing modules 530 may, for example, comprise various video, audio, textual and tactile signal-processing modules. The signal processing modules 530 may generally, for example, process information conveyed between the front ends 505 and 506 and communication interface module(s) 510 of the mobile communication device 500 and the user interface module(s) 540 of the mobile communication device 500.

The signal processing modules 530 may, for example and without limitation, comprise various video/graphics processing modules, various audio processing modules (e.g., VoIP processing modules) and various tactile processing modules. The signal processing modules 530 may, for example, share any or all characteristics with the communication manager modules 130, 230, 330 and 430 illustrated in FIGS. 1-4 and discussed previously.

The exemplary mobile communication device 500 may also comprise a communication pathway selection module 550 ("CPSM"). The CPSM 550 may, for example, share any or all characteristics with the CPSMs 150, 250, 350 and 450 discussed previously and various exemplary components thereof. The CPSM 550 may, for example, interface with (or utilize) any of the communication interface modules 510, user interface modules 540 or signal processing modules 530.

The exemplary mobile communication device 500 may also comprise a general processor 552 (and/or a digital signal processor) and on-board memory 555. The general processor 552, which may be a baseband processor, for example, and memory 555 may perform any of a wide variety of operational tasks for the mobile communication device 500. For example and without limitation, the general processor 552 and memory 555 may share various characteristics with the communication interface modules, communication manager modules, CPSMs and user interface modules of the exemplary mobile communication devices 100-400 illustrated in FIGS. 1-4 and discussed previously.

Figure 6:
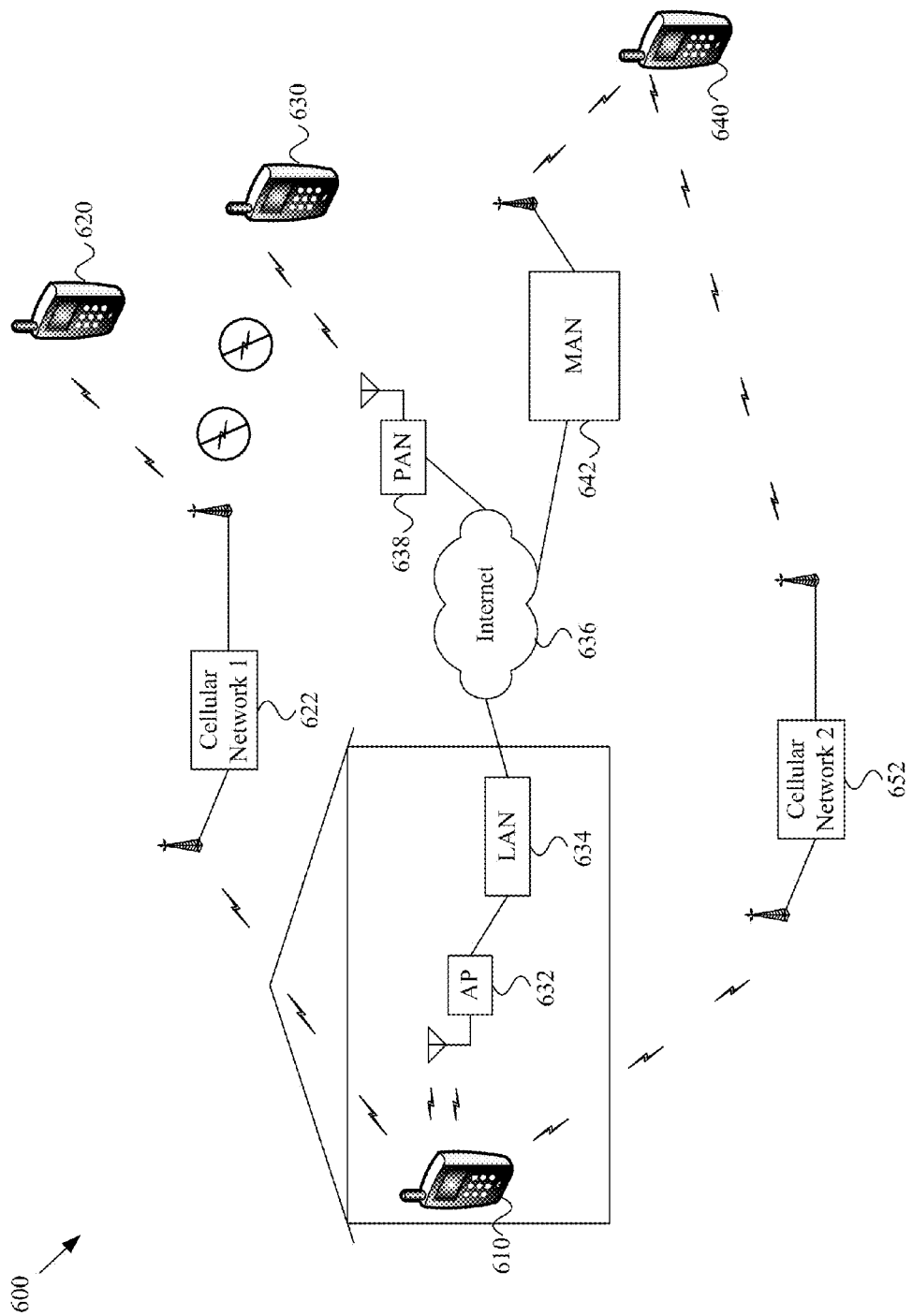
FIG. 6 is an exemplary communication environment in which a mobile communication device incorporating various aspects of the present invention might operate.

FIG. 6 is an exemplary communication environment 600 in which a mobile communication device incorporating various aspects of the present invention might operate. The exemplary communication environment 600 will be discussed below in the context of voice conversation communication. However, various aspects of the present invention should not be limited by particular characteristics of voice conversation communication.

In the exemplary communication environment 600, voice conversation communication may be conducted between the first mobile communication device 610 ("MCD") and the second MCD 620 through a first communication pathway comprising the first cellular network 622. Also, voice conversation communication may be conducted between the first MCD 610 and the third MCD 630 through a second communication pathway comprising a LAN 634, the Internet 636 and a PAN 638. Additionally, voice conversation communication may sometimes, but not presently, be conducted through a third communication pathway between the first MCD 610 and the third MCD 630 through the first cellular network 622. Further, voice conversation communication may be conducted between the first MCD 610 and the fourth MCD 640 through a fourth communication pathway comprising the LAN 634, the Internet 636 and a MAN 642. Still further, voice conversation communication may be conducted between the first MCD 610 and the fourth MCD 640 through a fifth communication pathway comprising the second cellular network 652.

In the exemplary scenario, the first MCD 610 (e.g., a communication pathway selection module thereof) may determine the availability of the various communication networks (or pathways) for conducting voice conversation communication between the first MCD 610 and the other MCDs 620, 630 and 640. Various manners of making such a determination were presented previously.

The first MCD 610 (e.g., a communication pathway selection module thereof in conjunction with a user interface module) may present visual indicia representing various communications that may occur between the first MCD 610 and the other MCDs 620, 630 and 640. For example, the first MCD 610 may present visual indicia to a user indicating that voice conversation communication may be conducted between the first MCD 610 and the second MCD 620 only over the first communication pathway (or first cellular network 622). The visual indicia may also indicate that voice conversation communication may be conducted between the first MCD 610 and the third MCD 630 over the second communication pathway (e.g., through the Internet 636), but not presently over the third communication pathway (e.g., through the first cellular network 622). The visual indicia may additionally indicate that voice conversation communication may be conducted between the first MCD 610 and the fourth MCD 640 over either of the fourth communication pathway and the fifth communication pathway.

A user of the first MCD 610 may, for example, select the visual indicium that is indicative of voice conversation communication with the fourth MCD 640 over the fourth communication pathway. The first MCD 610 (e.g., a communication pathway selection module thereof) may, from the user input, identify the fourth communication pathway (e.g., through the LAN 634, the Internet 636 and the MAN 642) for conducting voice conversation communication with the fourth MCD 640 and initiate such communication with the fourth MCD 640. In such a scenario, the first MCD 610 may, for example, establish a communication link with the LAN 634 through the LAN access point 632 and utilize an IP address of the fourth MCD 640 to address VoIP information to the fourth MCD 640 through the LAN 634, the Internet 636 and the MAN 642.

Alternatively, for example, a user of the first MCD 610 may attempt to select the visual indicium that is indicative of voice conversation communication with the third MCD 630 over the third communication pathway. The first MCD 610 (e.g., a communication pathway selection module thereof) may, for example, not allow the user to select that particular indium, since that particular indicium corresponds with an unavailable communication pathway).

Further for example, a user of the first MCD 610 may select the visual indicium that is indicative of voice conversation communication with the third MCD 630 over the second communication pathway. The first MCD 610 (e.g., a communication pathway selection module thereof) may, from the user input, identify the second communication pathway (e.g., through the LAN 634, the Internet 636 and the PAN 638) for conducting voice conversation communication with the third MCD 630 and initiate such communication with the third MCD 630. In such a scenario, the first MCD 610 may, for example, establish a communication link with the LAN 634 through the LAN access point 632 and utilize an IP address of the third MCD 630 to address VoIP information to the third MCD 630 through the LAN 634, the Internet 636 and the PAN 638.

Still further for example, a user of the MCD 610 may enter a first single command, where such a first single command (e.g., a single key press or single voice command) is associated with voice conversation communication with the third MCD 630 over the third communication pathway. The first MCD 610, determining that such communication is presently not available with the third MCD 630, may notify the user that such communication is presently not available. Such a notification may, for example, comprise notifying the user of alternative communication pathways. The user may then, for example, enter a second single command, where such a second single command is associated with voice conversation with the third MCD 630 over the second communication pathway. In response to such a second single command, the first MCD 610 (e.g., under direction of a communication pathway selection module thereof) may establish a communication link with the LAN 634 through the LAN access point 632 and utilize an IP address of the third MCD 630 to address VoIP information to the third MCD 630.

The exemplary mobile communication devices 100-500, 610, 620, 630 and 640 illustrated in FIGS. 1-6 and discussed previously were presented to provide non-limiting exemplary illustrations of various aspects of the present invention. Accordingly, the scope of various aspects of the present invention should not be limited by characteristics of the exemplary mobile communication devices.

Various aspects of the present invention have been described above with the aid of functional building blocks illustrating the performance of certain significant functions. The boundaries of these functional building blocks and relationships between various functional building blocks have been arbitrarily defined for convenience of description. Alternate boundaries or relationships could be defined as long as the certain significant functions are appropriately performed. Such alternate boundaries or relationships are thus within the scope and spirit of the claimed invention. Additionally, the functional building blocks, and other illustrative blocks, modules and components herein, can be implemented as illustrated or by discrete components, application specific integrated circuits, processors executing appropriate software and the like or any combination thereof.

Figure 7:
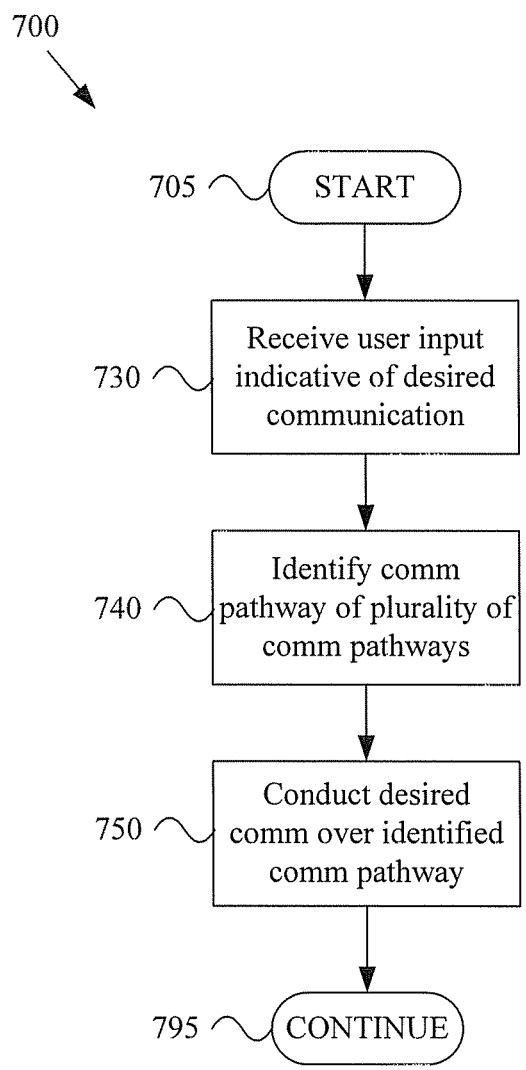
FIG. 7 is an exemplary method for providing multi-communication pathway addressing, in accordance with various aspects of the present invention.

FIG. 7 is an exemplary method 700 for providing multi-communication pathway addressing, in accordance with various aspects of the present invention. The exemplary method 700 may, for example, share any or all functional characteristics with the exemplary mobile communication devices 100, 200, 300, 400, 500, 610, 620, 630 and 640 illustrated in FIGS. 1-6 and discussed previously.

A mobile communication device may, for example, implement the exemplary method 700. Such a mobile communication device may comprise characteristics of any of a variety of types of mobile communication devices, non-limiting examples of which were presented previously. The mobile communication device may, for example, be capable of conducting a particular type of communication over any of a first plurality of communication networks.

The exemplary method 700 may begin executing at step 705. The exemplary method 700 may begin executing in response to any of a variety of causes or conditions. For example, the exemplary method 700 may begin executing in response to a power-up or reset condition of a mobile communication device implementing the method 700. Also for example, the exemplary method 700 may begin executing in response to a user input indicating the user would like to initiate a communication and/or explore various communication options.

The exemplary method 700 may, at step 730, comprise receiving a user input indicative of a desired communication (e.g., a desired communication with a particular other communication node using a particular type of communication). Step 730 may, for example and without limitation, share any or all functional characteristics with the exemplary user interface modules 140, 240, 340, 440 and 540 illustrated in FIGS. 1-6 and discussed previously.

Step 730 may comprise receiving a user input indicative of a desired communication in any of a variety of manners. For example and without limitation, step 730 may comprise receiving a user selection of an indicium (e.g., a visual indicium) corresponding to a desired communication. Such a desired communication may, for example, correspond to performing a particular type of communication with a particular other communication node (or device) over a particular communication network (or pathway). Many non-limiting examples of such user interaction were presented previously.

The exemplary method 700 may, at step 740, comprise identifying (e.g., from the user input received at step 730) at least one communication network (or communication pathway) of a plurality of communication networks (or communication pathways) with which the mobile communication device is capable of communicating. Step 740 may, for example and without limitation, share any or all functional characteristics with the communication pathway selection modules 150, 250, 350, 450 and 550 illustrated in FIGS. 1-6 and discussed previously.

Step 740 may comprise identifying at least one communication network (or communication pathway) in any of a variety of manners. For example and without limitation, step 740 may comprise accessing and analyzing information stored in local or remote storage. Such information may, for example, comprise information regarding the mobile communication device, other communication nodes (or devices), communication networks, capabilities of various communication devices, communication addresses (e.g., phone numbers, IP addresses, serial numbers, web addresses, other network addresses, etc.), user access privileges, present registered members of a network, etc. Also for example, step 740 may comprise communicating test messages with various communication entities (e.g., a destination communication node, network, central controller, gateway, etc.) to determine the present state of various communication pathways, capabilities of other communication nodes, etc. Various non-limiting examples of such test messaging were discussed previously.

The exemplary method 700 may, at step 750, comprise conducting the desired communication over the identified at least one communication network (or communication pathway). Step 750 may, for example and without limitation, share any or all functional characteristics with the exemplary communication manager modules 130, 230, 330, 430 or 530 and/or communication modules or applications illustrated in FIGS. 1-6 and discussed previously.

Step 750 may, for example and without limitation, comprise establishing a communication link between the mobile communication device and the communication network (or pathway) identified at step 740. Step 750 may, for example, comprise establishing such a communication link in accordance with respective communication protocols supported by the identified communication network. For example, in a non-limiting exemplary scenario, step 750 may comprise establishing a wireless IEEE 802.11 communication link to a LAN access point, which in turn is communicatively coupled to the Internet, to which a desired other communication node for the desired communication is communicatively coupled.

Step 750 may further for example, comprise, establishing a communication link with the desired communication node (or endpoint) specified by the user. Such a communication link may, for example, be a connection-oriented communication link or connectionless communication link, depending on the particular communication pathway or network(s) utilized.

Step 750 may also, for example, comprise performing the desired type of communication with the desired communication node over the identified communication network (or pathway). For example, in a non-limiting exemplary scenario, where the desired communication node is another mobile communication device, the desired particular type of communication is voice conversation communication and the identified communication network is a LAN, step 750 may comprise conducting voice conversation communication between the mobile communication device and the other mobile communication device utilizing VoIP communication over the LAN. Also for example, in a non-limiting exemplary scenario where the desired communication node is the other mobile communication device, the desired particular type of communication is voice conversation communication and the identified communication network is a cellular telephone network, step 750 may comprise conducting voice conversation communication between the mobile communication device and the other mobile communication device utilizing cellular telephony over the cellular telephone network.

Various aspects of the exemplary method 700 will now be presented by way of non-limiting exemplary scenarios. The scope of various aspects of the present invention should not be limited by characteristics of the non-limiting exemplary scenarios.

In a non-limiting exemplary scenario, the mobile communication device implementing the method 700 may be adapted to communicate voice conversation information with a plurality of communication networks (e.g., through a plurality of communication pathways). Such communication networks may, for example, comprise a cellular telephone network and a computer network. Such communication may, for example, be performed utilizing any of a variety of cellular telephone or computer network protocols, various examples of which were provided previously.

Continuing the exemplary scenario, step 730 may comprise receiving user input indicative of a desired voice conversation communication. In response to such a received user input, step 740 may comprise identifying, from at least the received user input, at least one communication network (or pathway) over which to conduct such communication. Step 750 may then comprise performing the desired voice conversation communication over the identified communication network (or pathway).

In another non-limiting exemplary scenario, a mobile communication device implementing the method 700 may be adapted to communicate multimedia conversation information with a plurality of communication networks (e.g., through a plurality of communication pathways). Such communication networks may, for example, comprise a cellular telephone or data network and one or more computer networks. Such communication may, for example, be performed utilizing any of a variety of cellular telephone or computer network protocols, various examples of were provided previously.

Continuing the exemplary scenario, step 730 may comprise receiving user input indicative of a desired multimedia conversation communication. In response to such a received user input, step 740 may comprise identifying, from at least the received user input, at least one communication network (or pathway) over which to conduct such communication. Step 750 may then comprise performing the desired multimedia conversation communication over the identified communication network (or pathway). For example, step 750 may comprise receiving outgoing audio/visual information from a user interface of the mobile communication device (e.g., through a microphone and camera) and communicating such information through an appropriate communication interface module of the mobile communication device. Step 750 may also comprise receiving incoming audio/visual information from one or more communication interface modules and communicating such information to a user interface module of the mobile communication device for presentation to the user (e.g., on a video display and speaker).

In an additional exemplary scenario, at least one communication interface module of a mobile communication device implementing the method 700 may be adapted to communicate instant text message information with a plurality of communication networks (e.g., through a plurality of communication pathways). Such communication networks may, for example, comprise a first computer network, a telephone network, a cable television network and a second computer network. Such communication may, for example, be performed utilizing any of a variety of telephone, television or computer network protocols, various examples of which were provided previously.

Continuing the exemplary scenario, step 730 may comprise receiving user input indicative of a desired instant text message communication. In response to such a received user input, step 740 may comprise identifying, from at least the received user input, at least one communication network (or pathway) over which to conduct such communication. Step 750 may then comprise performing the desired instant text message communication over the identified communication network (or pathway).

In yet another non-limiting exemplary scenario, step 730 may comprise receiving a single user command (e.g., a single key press, single touch or single voice command), which may, for example, be associated with a particular other communication node (or device), particular type of communication and particular communication network (or communication pathway). In such an exemplary scenario, step 740 may comprise identifying, from the single received command, another communication device (or devices) with which to communicate, a particular type of communication and at least one communication network (or pathway) of a plurality of communication networks (or pathways) over which to communicate with the identified communication node (or device) using the identified type of communication. Step 750 may then comprise conducting the identified type of communication with the identified communication node over the identified communication network(s) or pathway(s).

In still another non-limiting exemplary scenario, a mobile communication device implementing the method 700 may be adapted to communicate web-browsing information with a plurality of communication networks (e.g., through a plurality of communication pathways). Such communication networks may, for example, comprise a first computer network, a telephone network, a cable television network and a second computer network. Such communication may, for example, be performed utilizing any of a variety of telephone, television or computer network protocols, various examples of which have been provided and/or will be provided later.

Continuing the exemplary scenario, step 730 may comprise receiving user input indicative of a desired web browsing communication. In response to such a received user input, step 740 may comprise identifying, from at least the received user input, at least one communication network (or pathway) over which to conduct such communication. Step 750 may then comprise performing the desired web browsing communication over the identified communication network (or pathway).

Figure 8:
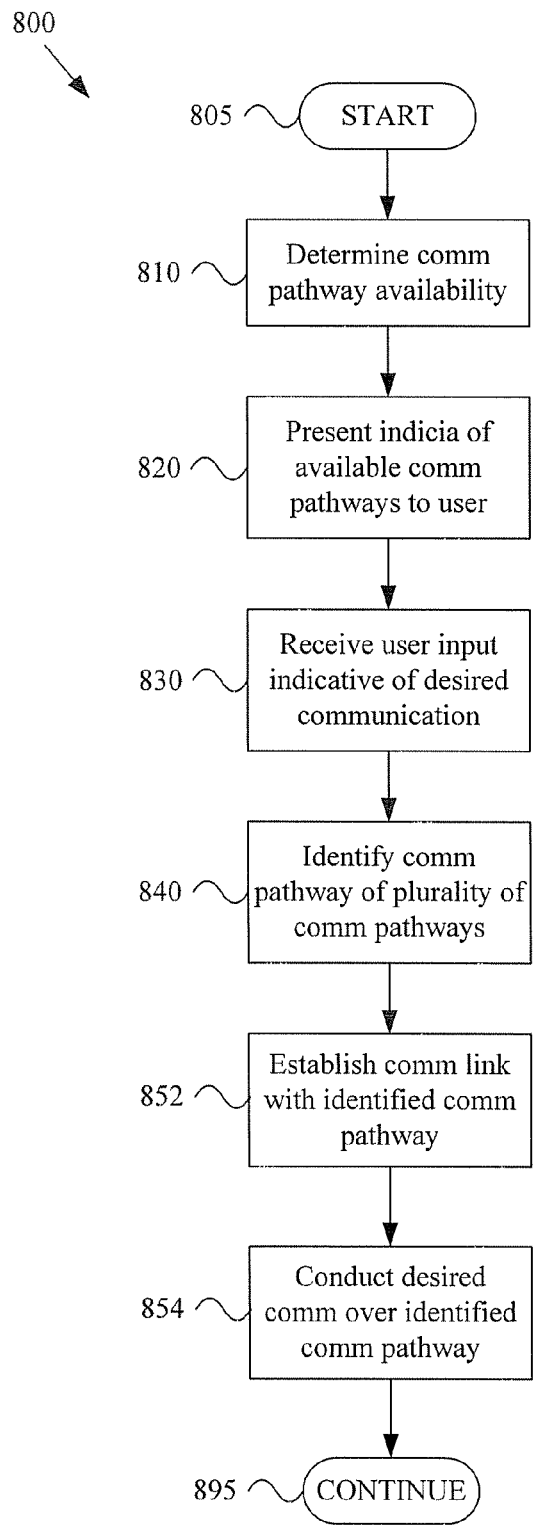
FIG. 8 is an exemplary method for providing multi-communication pathway addressing, in accordance with various aspects of the present invention.

FIG. 8 is an exemplary method 800 for providing multi-communication pathway addressing, in accordance with various aspects of the present invention. The exemplary method 800 may, for example, share any or all characteristics with the exemplary method 700 illustrated in FIG. 7 and discussed previously. The exemplary method 800 may also, for example, share any or all functional characteristics with the exemplary mobile communication devices 100, 200, 300, 400, 500, 610, 620, 630 and 640 illustrated in FIGS. 1-6 and discussed previously.

A mobile communication device may, for example, implement the exemplary method 800. Such a mobile communication device may comprise characteristics of any of a variety of types of mobile communication devices, non-limiting examples of which were presented previously. The mobile communication device may, for example, be capable of conducting a particular type of communication over any of a first plurality of communication networks.

The exemplary method 800 may begin executing at step 805. The exemplary method 800 may begin executing in response to any of a variety of causes or conditions. For example, the exemplary method 800 may begin executing in response to a power-up or reset condition of a mobile communication device implementing the method 800. Also for example, the exemplary method 800 may begin executing in response to a user input indicating the user would like to initiate a communication and/or explore various communication options.

The exemplary method 800 may, at step 810, comprise determining which of a first plurality of communication networks (or communication pathways) is available (e.g., for performing a particular type of communication). A second plurality of communication networks may, for example, be potentially available for another particular type of communication, where there might be overlap between the first and second pluralities. Step 810 may, for example and without limitation, share any or all functional characteristics with the communication pathway selection modules 150, 250, 350, 450 and 550 illustrated in FIGS. 1-6 and discussed previously.

Step 810 may comprise determining which of the first plurality of communication networks is available (e.g., for performing the particular type of communication) in any of a variety of manners. For example and without limitation, step 810 may comprise accessing information in a remote or local database, where such information may comprise any of a variety of characteristics (e.g., information of network availability, availability of particular types of communication, capabilities of the mobile communication device and/or other communication nodes or devices, address information, access privilege information, information of communication devices registered for a particular communication network, etc.).

The exemplary method 800 may, at step 820, comprise presenting a plurality of indicia (e.g., visible indicia) to a user. Each presented indicium may, for example, be associated with performing a particular type of communication over a respective communication network. Various non-limiting examples of such indicia were discussed previously with regard to various user interface modules. For example and without limitation, the presented visual indicia may each comprise visual characteristics indicating whether a respective particular communication network (or communication pathway) associated with the indicia is presently available for communication (e.g., available for a particular type of communication).

The exemplary method 800 may, at step 830, comprise receiving user input indicative of a desired communication. Step 830 may, for example and without limitation, share any or all characteristics with step 730 of the exemplary method 700 of FIG. 7. Step 830 may also, for example, share any or all functional characteristics with the user interface modules discussed previously. For example and without limitation, step 830 may comprise receiving a user selection of one of a plurality of presented indicia (e.g., as might be presented at step 820).

The exemplary method 800 may, at step 840, comprise identifying at least one communication network (or communication pathway) of a plurality of communication networks (or pathways). Step 840 may, for example and without limitation, share any or all characteristics with step 740 of the exemplary method 700 of FIG. 7. Step 840 may, for example, comprise identifying a respective one of a plurality of communication networks (or pathways) associated with a selected visual indicium (e.g., as might have been selected at step 830).

The exemplary method 800 may, at step 852, comprise establishing a communication link with a communication network (or pathway) identified at step 840. Step 852 may, for example, comprise establishing such a communication link in any of a variety of manners associated with particular networks, pathways or types of communication. The exemplary method 800 may, at step 854, comprise conducting the desired communication over the identified communication network (or pathway). Step 854 may, for example, comprise conducting such communication in accordance with one or more communication protocols associated with the particular communication network (or pathway) or type of communication. Exemplary steps 852 and 854 may, for example, share any or all characteristics with the exemplary step 750 of FIG. 7. Also for example. Exemplary steps 852 and 854 may share any or all functional characteristics with the communication manager modules and/or communication modules or applications discussed previously.

The exemplary methods 700 and 800 illustrated in FIGS. 7-8 were presented to provide non-limiting exemplary illustrations of various functional aspects of the present invention. Accordingly, the scope of various aspects of the present invention should not be limited by characteristics of the exemplary methods 700 and 800.

Various aspects of the present invention have also been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claimed invention.

In summary, various aspects of the present invention provide a system and method for performing multi-communication pathway addressing in a mobile communication device. While the invention has been described with reference to certain aspects and embodiments, it will be understood by those skilled in the art that various changes may be made and equivalents may be substituted without departing from the scope of the invention. In addition, many modifications may be made to adapt a particular situation or material to the teachings of the invention without departing from its scope. Therefore, it is intended that the invention not be limited to the particular embodiment disclosed, but that the invention will include all embodiments falling within the scope of the appended claims.

What is claimed is:

1. A mobile communication device, comprising:
a communication interface module configured to communicate with a plurality of communication networks;
a module configured to utilize the communication interface module to conduct a plurality of types of communication over any of the plurality of communication networks; and
an interface module configured to receive an input indicative of a desired type of communication from the plurality of types of communication;
wherein, in response to receiving the input indicative of the desired type of communication from the plurality of types of communication:
the module is configured to identify one or more communication networks, from the plurality of communication networks, capable of conducting the desired type of communication;
the interface module is configured to output one or more visual indicators which correspond to the one or more identified communication networks, respectively;
the interface module is configured to receive a selection of a visual indicator from the one or more visual indicators; and
the module is configured to utilize the communication interface module to conduct the desired type of communication over an identified communication network from the one or more identified communication networks that corresponds to the selected visual indicator.

2. The mobile communication device of claim 1, wherein the one or more visual indicators comprise a visual characteristic indicating whether a particular third party is available over the one or more identified communication networks corresponding to the one or more visual indicators, respectively.

3. The mobile communication device of claim 1, wherein the one or more visual indicators include:
a first visual indicator that comprises a visual characteristic indicating that a first one of the one or more identified communication networks is not presently available for communication; and
a second visual indicator that comprises a visual characteristic indicating that a second one of the one or more identified communication networks is presently available for communication.

4. The mobile communication device of claim 1, wherein the interface module is configured to output the one or more visual indicators in response to receiving an input indicative of communicating with another communication device.

5. The mobile communication device of claim 1, wherein the module is further configured to:

determine which of the plurality of communication networks is available for performing the desired type of communication; and direct the interface module to output the one or more visual indicators in accordance with the determined availability of the plurality of communication networks for performing the desired type of communication.

6. The mobile communication device of claim 5, wherein the module is configured to determine which of the plurality of communication networks is available for performing the desired type of communication by accessing information in a database.

7. The mobile communication device of claim 1, wherein:
the desired type of communication is voice communication; and
the selected visual indicator comprises a graphical characteristic indicative of voice communication.

8. The mobile communication device of claim 7, wherein:
a first communication network of the plurality of communication networks is a cellular telephone communication network; and
a second communication network of the plurality of communication networks is a general data network.

9. The mobile communication device of claim 1, wherein:
the desired type of communication is multimedia communication; and
the selected visual indicator comprises a graphical characteristic indicative of multimedia communication.

10. The mobile communication device of claim 9, wherein:
a first communication network of the plurality of communication networks is a cellular telephone communication network; and
a second communication network of the plurality of communication networks is a general data network.

11. The mobile communication device of claim 1, wherein:
the desired type of communication is text message communication; and
the selected visual indicator comprises a graphical characteristic indicative of text message communication.

12. The mobile communication device of claim 1 wherein:
the desired type of communication is web browsing communication; and
the selected visual indicator comprises a graphical characteristic indicative of web browsing communication.

13. A mobile communication device, comprising:
a communication interface module configured to communicate with a plurality of communication networks;
a module configured to utilize the communication interface module to conduct a plurality of types of communication over any of the plurality of communication networks; and
an interface module configured to receive a command indicative of a desired type of communication from the plurality of types of communication;
wherein, in response to receiving the command, the module is configured to:
identify, from the received command, a communication node with which to perform the desired type of communication, and a communication network of the plurality of communication networks over which to communicate with the identified communication node using the desired type of communication; and
utilize the communication interface module to conduct the desired type of communication with the identified communication node over the identified communication network.

14. The mobile communication device of claim 13, wherein the command is a key press input.

15. The mobile communication device of claim 13, wherein the command is a voice command.

16. The mobile communication device of claim 13, wherein the command is a touch input.

17. A method, comprising:
in a mobile communication device capable of conducting a plurality of types of communication over any of a plurality of communication networks:
receiving an input indicative of a desired type of communication from the plurality of types of communication; and
in response to receiving the input indicative of the desired type of communication from the plurality of types of communication:
identifying one or more communication networks, from the plurality of communication networks, capable of conducting the desired type of communication;
outputting one or more visual indicators that correspond to the one or more identified communication networks, respectively;
receiving a selection of a visual indicator from the one or more visual indicators; and
conducting the desired type of communication over an identified communication network from the one or more identified communication networks that corresponds to the selected visual indicator.

18. The method of claim 17, wherein the one or more visual indicators comprise a visual characteristic indicating whether a particular third party is available over the one or more identified communication networks corresponding to the one or more visual indicators, respectively.

19. The method of claim 17, wherein the one or more visual indicators include:
a first visual indicator that comprises a visual characteristic indicating that a first one of the one or more identified communication networks is not presently available for communication; and
a second visual indicator that comprises a visual characteristic indicating that a second one of the one or more identified communication networks is presently available for communication.

20. The method of claim 17, comprising outputting the one or more visual indicators in response to receiving an input indicative of communicating with another communication device.

21. A mobile communication device comprising:
a communication interface module configured to communicate with a plurality of communication networks;
a module configured to utilize the communication interface module to communicate a particular type of data over one or more of the plurality of communication networks; and
an input interface module configured to receive a first input indicative of a desired type of data to be communicated;
wherein, in response to receiving the first input indicative of the desired type of data:
the module is configured to identify a communication network, from among the plurality of communication networks, capable of communicating the desired type of data;
the input interface module is configured to output a visual indicator corresponding to the identified communication network;

the input interface module is configured to receive a second input that selects the visual indicator corresponding to the identified communication network; and the module is configured to utilize the communication interface module to communicate the desired type of data over the identified communication network corresponding to the selected visual indicator.

* * * * *

UNITED STATES PATENT AND TRADEMARK OFFICE
CERTIFICATE OF CORRECTION

| | | |
|---|---|---|
| PATENT NO. | : 8,838,101 B2 | Page 1 of 1 |
| APPLICATION NO. | : 13/041607 | |
| DATED | : September 16, 2014 | |
| INVENTOR(S) | : Jeyhan Karaoguz | |

It is certified that error appears in the above-identified patent and that said Letters Patent is hereby corrected as shown below:

On the Title Page, Item (56), Foreign Patent Documents, please delete the duplicate "EP    1 241  905  9/2002.".

In the Claims

Column 24, line 50, please replace "device" with --device,--.

Signed and Sealed this
Sixth Day of January, 2015

Michelle K. Lee
*Deputy Director of the United States Patent and Trademark Office*